US010948918B2

(12) United States Patent
Dey et al.

(10) Patent No.: US 10,948,918 B2
(45) Date of Patent: Mar. 16, 2021

(54) CONTEXT BASED PATH PLANNING FOR VECTOR NAVIGATION IN HEXAGONAL SPATIAL MAPS

(71) Applicant: Tata Consultancy Services Limited, Mumbai (IN)

(72) Inventors: Sounak Dey, Kolkata (IN); Arijit Mukherjee, Kolkata (IN); Aritra Sarkar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 311 days.

(21) Appl. No.: 16/190,894

(22) Filed: Nov. 14, 2018

(65) Prior Publication Data
US 2019/0265711 A1    Aug. 29, 2019

(30) Foreign Application Priority Data
Feb. 23, 2018   (IN) .............................. 201821007023

(51) Int. Cl.
*G05D 1/02*    (2020.01)
*G01C 21/00*    (2006.01)
(Continued)

(52) U.S. Cl.
CPC ......... *G05D 1/0221* (2013.01); *G01C 21/005* (2013.01); *G01C 21/20* (2013.01);
(Continued)

(58) Field of Classification Search
CPC .. G05D 1/0221; G05D 1/0088; G01C 21/005; G01C 21/206; G01C 21/20; G01C 21/32; G01C 21/3415
See application file for complete search history.

(56) References Cited

U.S. PATENT DOCUMENTS 4,874,936 A * 10/1989 Chandler ............. G06K 7/1417
235/494
4,998,010 A * 3/1991 Chandler ............. G06K 7/1093
235/462.04
(Continued)

FOREIGN PATENT DOCUMENTS

CN        103413313        11/2013

OTHER PUBLICATIONS

V.R Jisha, D. Ghose, Frontier Based Goal Seeking for Robots in Unknown Environments, 2012, Springer (Year: 2012).*

*Primary Examiner* — Frederick M Brushaber
(74) *Attorney, Agent, or Firm* — Finnegan, Henderson, Farabow, Garrett & Dunner, LLP

(57) ABSTRACT

Path planning for a robot is a compute intensive task. For a dynamic environment this is more cumbersome where position and orientation of objects changes often. Embodiments of the present disclosure provide systems and methods for context based path planning for vector navigation in hexagonal spatial maps. A 2-D environment is represented into a hexagonal grid map that includes hexagonal grid cells, objects are identified based on a comparison of RGB value associated with contiguous cells. Candidate contexts are determined based on objects identified. The hexagonal grid map is rotated at various angles and compared with pre-defined map(s) to determine quantitative measure of similarity for contexts identification from the candidate contexts, based upon which a path is dynamically planned for easy and efficient vector navigation within the hexagonal grid map. The embodiments further enable generating paths for different contexts using navigable common object(s) identified between intersections of the different contexts.

20 Claims, 12 Drawing Sheets

(51) Int. Cl.
*G01C 21/20* (2006.01)
*G01C 21/32* (2006.01)
*G01C 21/34* (2006.01)
*G05D 1/00* (2006.01)

(52) U.S. Cl.
CPC .......... *G01C 21/206* (2013.01); *G01C 21/32* (2013.01); *G01C 21/3415* (2013.01); *G05D 1/0088* (2013.01)

(56) References Cited

U.S. PATENT DOCUMENTS

| | | |
|---|---|---|
| 9,619,561 B2 | 4/2017 | Chrysanthakopoulos |
| 2012/0232795 A1 | 9/2012 | Robertson et al. |
| 2019/0122409 A1* | 4/2019 | Meadows ............ G06N 3/0454 |

* cited by examiner (c) translated path

CONTEXT BASED PATH PLANNING FOR VECTOR NAVIGATION IN HEXAGONAL SPATIAL MAPS

PRIORITY CLAIM

This U.S. patent application claims priority under 35 U.S.C. § 119 to: India Application No. 201821007023, filed on Feb. 23, 2018. The entire contents of the aforementioned application are incorporated herein by reference.

TECHNICAL FIELD

The disclosure herein generally relates to path planning and navigational techniques, and, more particularly, to context based path planning for vector navigation in hexagonal spatial maps.

BACKGROUND

Robots (in general machines) today are being made artificially intelligent (AI) by using techniques like machine learning, deep learning, and the like. However main drawbacks of these genres of techniques are: firstly, they need huge volume of training data to be fed into the system so that the system learns a model about the data and its features; then this trained system can identify or take decision for new incoming data of same category. Secondly, if some features of the training data changes then the system need to be re-trained in order to work with new types of data. Since the volume of the required training data is huge and every time the system needs to be re-trained with new type of similar data, this kind of artificial intelligence technologies are not only very complex and time consuming but they also consume a lot of energy.

SUMMARY

Embodiments of the present disclosure present technological improvements as solutions to one or more of the above-mentioned technical problems recognized by the inventors in conventional systems. For example, in one aspect, there is provided a processor implemented method for context based path planning for vector navigation in hexagonal spatial maps. The method comprises: obtaining and representing a two-dimensional (2D) environment into a hexagonal grid map, wherein the hexagonal grid map comprises a plurality of hexagonal grid cells; identifying one or more objects based on a comparison of Red Green Blue (RGB) value associated with a plurality of two or more contiguous cells from the plurality of hexagonal grid cells, wherein the one or more objects are identified based on number of hexagonal centers and distance of center of each hexagonal grid cell from center of one or more hexagonal grid cells from the plurality of hexagonal grid cells; identifying one or more candidate contexts based on a tuple created for the identified one or more objects; iteratively performing a comparison of the hexagonal grid map with one or more pre-stored hexagonal grid maps, wherein the hexagonal grid map is transformed to one or more variations (e.g., using rotation technique, affine transformation technique, topological transformation technique, and the like) and iteratively compared with the one or more pre-stored hexagonal grid maps obtained from a map database to determine a Spatial Similarity Quotient (SSQ) (also referred as 'quantitative measure of similarity'), wherein the Spatial Similarity Quotient is indicative of degree of overlap of the hexagonal grid map with at least one of the one or more pre-stored hexagonal grid maps; identifying one or more contexts from the one or more candidate contexts based on the determined spatial similarity quotient; and dynamically planning a path for vector navigation within the hexagonal grid map based on the one or more objects, and the identified one or more contexts.

In an embodiment, the method further comprises generating an object database for each of the one or more objects based on an annotation, side of bounding square, a template shape, and a variance in the RGB value; and generating a context database for each of the one or more probable contexts with the identified one or more objects in a tuple.

In an embodiment, the one or more objects are identified as one or more predefined objects when the RGB value of the one or more objects is equal to a predefined threshold. In another embodiment, the one or more objects are identified as new objects when the RGB value of the one or more objects is greater than or less than the predefined threshold. In an embodiment, size and shape of the one or more objects are determined based on the distance (e.g., Euclidean distance between two hexagonal centers).

In an embodiment, the method further comprises identifying one or more common objects that indicate an intersection of two or more contexts; and generating a path based on one or more navigable objects identified from the one or more common objects from the intersection of the two or more contexts.

In an embodiment, the one or more contexts and the one or more objects may be identified using information obtained from one or more sensors.

In an embodiment, the method may further comprise training a robot using the dynamically planned path, the one or more contexts and the one or more objects identified for subsequent path planning and vector navigation; and generating a database comprising information pertaining to the subsequent path planning and vector navigation.

In an embodiment, the method may further comprise performing a comparison of the hexagonal grid map with the one or more candidate contexts to obtain a maximum SSQ; and identifying an environment as a new environment or a pre-defined environment based on the comparison of the maximum SSQ with a pre-defined threshold.

In another aspect, there is provided a system for context based path planning for vector navigation in hexagonal spatial maps. The system comprises a memory storing instructions; one or more communication interfaces; and one or more hardware processors coupled to the memory via the one or more communication interfaces, wherein the one or more hardware processors are configured by the instructions to: obtain and represent a two-dimensional (2D) environment into a hexagonal grid map, wherein the hexagonal grid map comprises a plurality of hexagonal grid cells; identify one or more objects based on a comparison of Red Green Blue (RGB) value associated with a plurality of two or more contiguous cells from the plurality of hexagonal grid cells, wherein the one or more objects are identified based on number of hexagonal centers and distance of center of each hexagonal grid cell from center of one or more hexagonal grid cells from the plurality of hexagonal grid cells; identifying one or more candidate contexts based on a tuple created for the identified one or more objects; iteratively perform a comparison of the hexagonal grid map with one or more pre-stored hexagonal grid maps, wherein the hexagonal grid map is transformed to one or more variations (e.g., using rotation technique, affine transformation technique, topological transformation technique, and the like)

and iteratively compared with the one or more pre-stored hexagonal grid maps obtained from a map database to determine a Spatial Similarity Quotient (SSQ) (also referred as 'quantitative measure of similarity'), wherein the Spatial Similarity Quotient is indicative of degree of overlap of the hexagonal grid map with at least one of the one or more pre-stored hexagonal grid maps; identify one or more contexts from the one or more candidate contexts based on the determined spatial similarity quotient; and dynamically plan a path for vector navigation within the hexagonal grid map based on the one or more objects, and the identified one or more contexts.

In an embodiment, the hardware processors are further configured by the instructions to generate an object database for each of the one or more objects based on an annotation, side of bounding square, a template shape, and a variance in the RGB value; and generate a context database for each of the one or more probable contexts with the identified one or more objects in a tuple.

In an embodiment, the one or more objects are identified as one or more predefined objects when the RGB value of the one or more objects is equal to a predefined threshold. In another embodiment, the one or more objects are identified as new objects when the RGB value of the one or more objects is greater than or less than the predefined threshold. In an embodiment, size and shape of the one or more objects are determined based on the distance (e.g., Euclidean distance between two hexagonal centers).

In an embodiment, the hardware processors are further configured by the instructions to identify one or more common objects that indicate an intersection of two or more contexts; and generate a path based on one or more navigable objects identified from the one or more common objects from the intersection of the two or more contexts.

In an embodiment, the one or more contexts and the one or more objects may be identified using information obtained from one or more sensors.

In an embodiment, the hardware processors are further configured by the instructions to train a robot using the dynamically planned path, the one or more contexts and the one or more objects identified for subsequent path planning and vector navigation; and generate a database comprising information pertaining to the subsequent path planning and vector navigation.

In an embodiment, the method may further comprise performing a comparison of the hexagonal grid map with the one or more candidate contexts to obtain a maximum SSQ; and identifying an environment as a new environment or a pre-defined environment based on the comparison of the maximum SSQ with a pre-defined threshold.

In yet another aspect, there is provided one or more non-transitory machine readable information storage mediums comprising one or more instructions. The one or more instructions which when executed by one or more hardware processors causes to perform a method comprising: obtaining and representing a two-dimensional (2D) environment into a hexagonal grid map, wherein the hexagonal grid map comprises a plurality of hexagonal grid cells; identifying one or more objects based on a comparison of Red Green Blue (RGB) value associated with a plurality of two or more contiguous cells from the plurality of hexagonal grid cells, wherein the one or more objects are identified based on number of hexagonal centers and distance of center of each hexagonal grid cell from center of one or more hexagonal grid cells from the plurality of hexagonal grid cells; identifying one or more candidate contexts based on a tuple created for the identified one or more objects; iteratively performing a comparison of the hexagonal grid map with one or more pre-stored hexagonal grid maps, wherein the hexagonal grid map is transformed to one or more variations (e.g., using rotation technique, affine transformation technique, topological transformation technique, and the like) and iteratively compared with the one or more pre-stored hexagonal grid maps obtained from a map database to determine a Spatial Similarity Quotient (SSQ) (also referred as 'quantitative measure of similarity'), wherein the Spatial Similarity Quotient is indicative of degree of overlap of the hexagonal grid map with at least one of the one or more pre-stored hexagonal grid maps; identifying one or more contexts from the one or more candidate contexts based on the determined spatial similarity quotient; and dynamically planning a path for vector navigation within the hexagonal grid map based on the one or more objects, and the identified one or more contexts.

In an embodiment, the instructions further cause generating an object database for each of the one or more objects based on an annotation, side of bounding square, a template shape, and a variance in the RGB value; and generating a context database for each of the one or more probable contexts with the identified one or more objects in a tuple.

In an embodiment, the one or more objects are identified as one or more predefined objects when the RGB value of the one or more objects is equal to a predefined threshold. In another embodiment, the one or more objects are identified as new objects when the RGB value of the one or more objects is greater than or less than the predefined threshold. In an embodiment, size and shape of the one or more objects are determined based on the distance (e.g., Euclidean distance between two hexagonal centers).

In an embodiment, the instructions further cause identifying one or more common objects that indicate an intersection of two or more contexts; and generating a path based on one or more navigable objects identified from the one or more common objects from the intersection of the two or more contexts.

In an embodiment, the one or more contexts and the one or more objects may be identified using information obtained from one or more sensors.

In an embodiment, the instructions further cause training a robot using the dynamically planned path, the one or more contexts and the one or more objects identified for subsequent path planning and vector navigation; and generating a database comprising information pertaining to the subsequent path planning and vector navigation.

In an embodiment, the instructions further cause performing a comparison of the hexagonal grid map with the one or more candidate contexts to obtain a maximum SSQ; and identifying an environment as a new environment or a pre-defined environment based on the comparison of the maximum SSQ with a pre-defined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
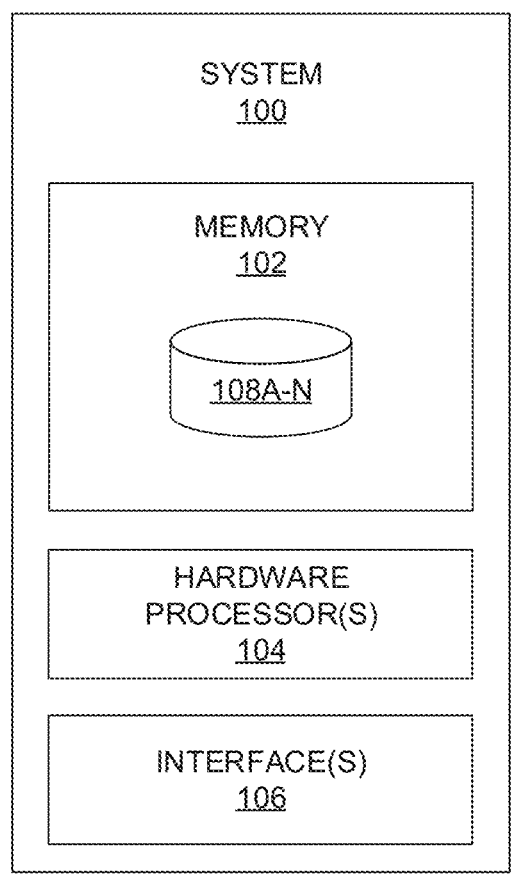
FIG. 1 illustrates an exemplary block diagram of a system for context based path planning for vector navigation in hexagonal spatial maps according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As described above, robots are being made artificially intelligent by using techniques for example, machine learning, deep learning etc., for navigation applications which require huge volume of training data to be able to learn and adopt the data and its features. However, these type of techniques have several challenges in terms of volume of training data required, and system requiring to undergo re-training in order to work with any new data types which leads to complexity, consumption of time and energy and more computational power.

On the other hand, this is not the case for mammalian brains. Mammalian brains, for example, human brains, can be trained on very minimal set of data and can re-train itself with again very minimal set of data. With these, it can identify and handle different contexts and semantics of same data. And all these are done very quickly and by consuming much less energy than conventional AI systems.

Implementing techniques, which human brain uses, to train machines is thus currently the focus of the present disclosure. Brain stores spatial and temporal information differently but handles them seamlessly by quickly switching contexts. In the present disclosure, embodiments thereof focus on spatial information representation like brain and have shown that how efficiently that can be used for intelligent path planning for robotic navigation. Following are the key challenge areas:

Robots need to do a lot of real time path planning for easy navigation. This is a very time consuming and complex task for them. This becomes more complex in case of dynamic environments. Moreover, all the path planning algorithms use square grids to represent the environment and plan the path accordingly. On the other hand, brain represents environment by a superposition of multiple hexagonal grid tessellation.

At the same time, though there are efforts in terms of identifying spatial similarity between two environments for robotic path planning, but they are not very efficient like brain and they do not work on hexagonal grid systems. Thus identifying spatial similarity between two environments can give information to the robot how to save on computation effort of path planning in second environment.

Embodiments of the present disclosure provide systems and methods for creating and using spatial context of environments for robotic path planning in different environments. Brain does this very efficiently for path planning. By repeating spatial information or by finding spatial similarities (within a threshold limit) can create a spatial context and that again can be used for easy navigation between spatial environments with different context.

In the present disclosure, embodiments implement utilization of brain techniques for representing environmental maps and then planning path of navigation for a robot in that map. For this to be achieved, the environment is converted to or represented in the form of a hexagonal grid map. The embodiments of the present disclosure provides systems and methods to create object database and context database for robots. The embodiments of the present disclosure further enable identifying spatial similarity between two (or more) such maps and introduce a quantitative measure for that spatial similarity namely Spatial Similarity Quotient (SSQ). By repeating more spatial information the present disclosure proposes to create contexts out of that information and then use them for seamless navigation in contextually different environments.

Furthermore, maps are usually represented in square grids or in terms of occupancy grids but this way they are not brain-like. Hence the present disclosure focuses on hexagonal grid structure map to be in line with brain. Path planning algorithms usually do not work for hexagonal grids. The present disclosure also adapts to existing algorithms to work in hexagonal grids. Currently traditional path planning and navigation systems do not focus on spatial similarity of environments. In contrast, the present disclosure focuses on path planning and navigation systems that utilizes spatial similarity of environments to measure spatial similarity between two environments. Based on this similarity, the system calculates probable spatial distribution of dynamic objects for each environment. Moreover, the present disclosure also implemented semantic context stitching for longer inter-context path planning.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 illustrates an exemplary block diagram of a system 100 for context based path planning for vector navigation in hexagonal spatial maps according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors.

In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment one or more database(s) 108A-N (e.g., an object database, a context database, a map database) can be stored in the memory 102, wherein the database(s) 108A-N may comprise, but are not limited to information pertaining to one or more objects, one or more contexts, one or more pre-defined thresholds, one or more pre-defined hexagonal spatial maps, training data, and the like. In an embodiment, the memory 102 may store training data that is learnt by the system 100, which gets utilized by the one or more hardware processors 104 (or by the system 100) to enable learning of the data patterns, evaluate the learning pattern, and train the system 100 using the training data to perform the methodology described herein.

Figure 2:
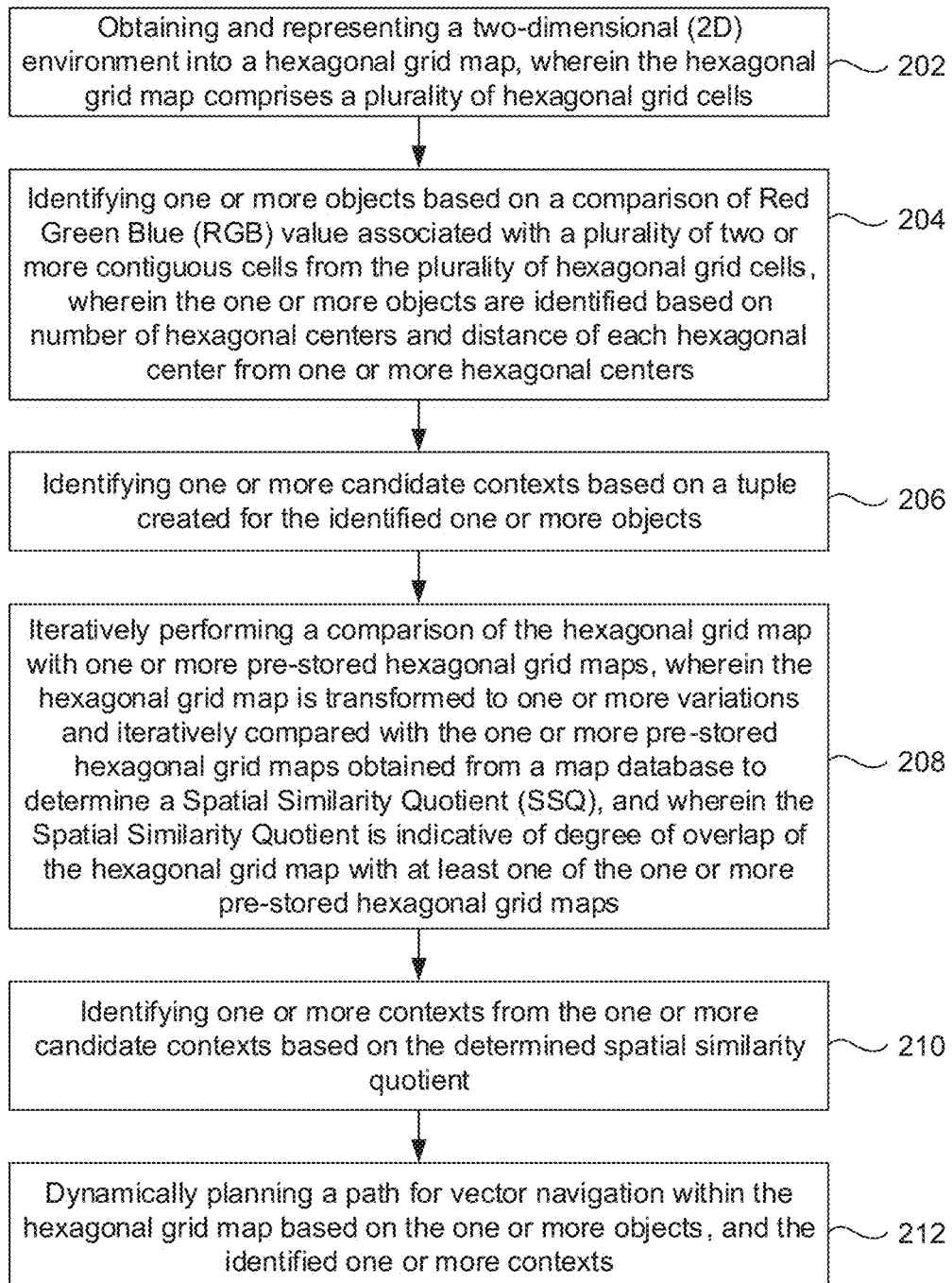
FIG. 2 illustrates an exemplary method for context based path planning for vector navigation in hexagonal spatial maps using the system of FIG. 1 according to an embodiment of the present.

FIG. 2, with reference to FIG. 1, illustrates an exemplary method for context based path planning for vector navigation in hexagonal spatial maps using the system 100 of FIG. 1 according to an embodiment of the present. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram of FIG. 2.

Figure 3A:
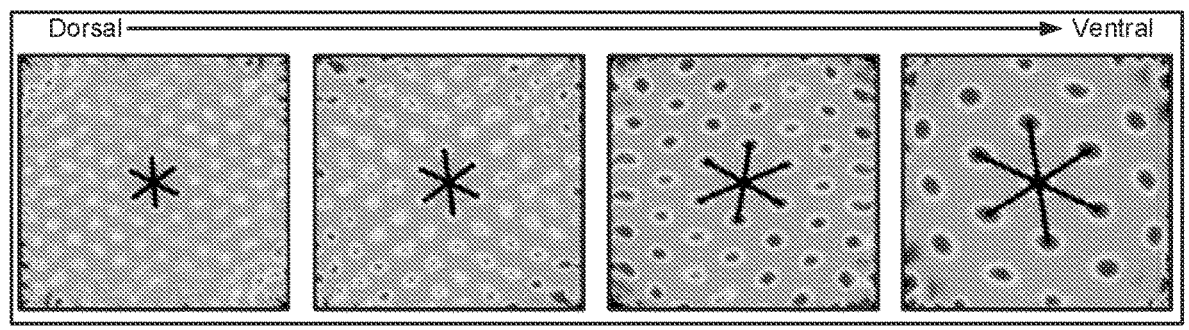
FIG. 3A depicts an exemplary view of a hexagonal representation of map in brain in accordance with an example embodiment of the present disclosure.
Figure 3B:
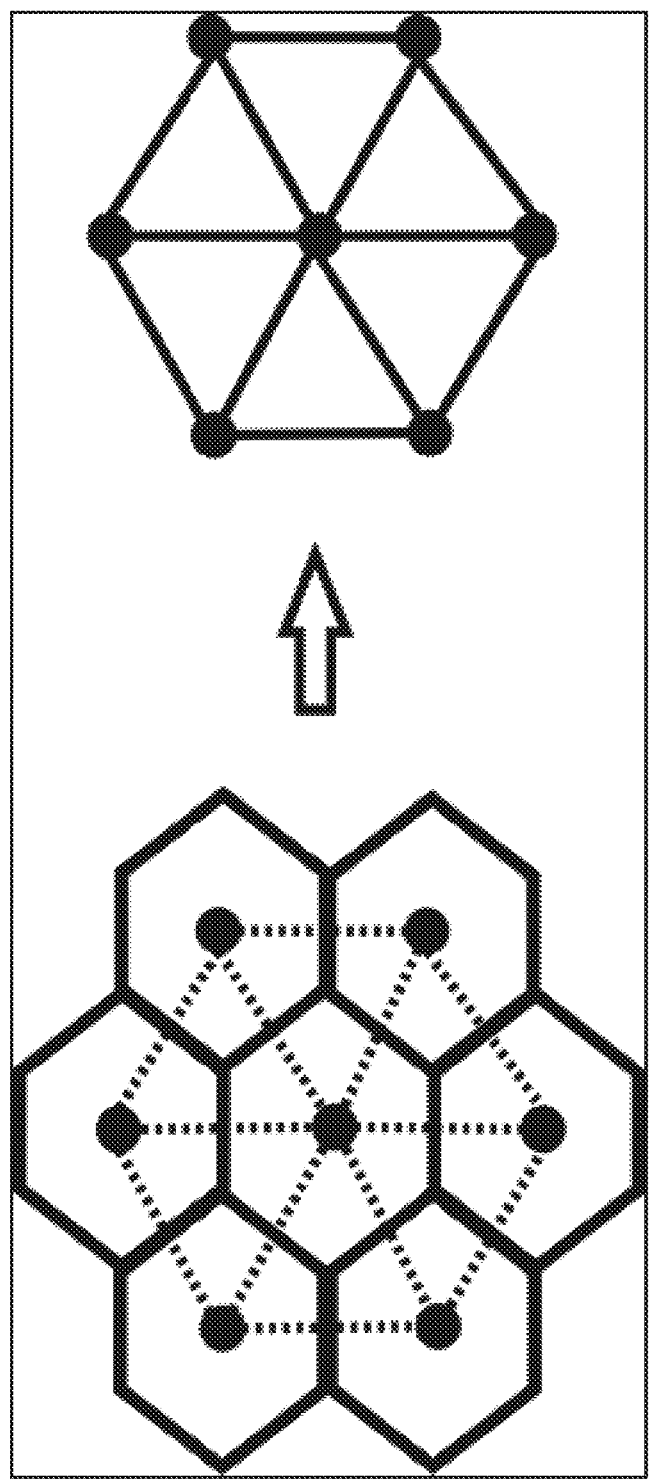
FIG. 3B depicts creation of dual of contiguous hexagonal centers used as basic building block for creating hexagonal tessellation of an environment in accordance with an example embodiment of the present disclosure.

FIG. 3A, with reference to FIGS. 1-2, depicts an exemplary view of a hexagonal representation of map in brain in accordance with an example embodiment as authored by G. Buzsáki and E. I. Moser, literature titled "Memory, navigation and theta rhythm in the hippocampal-entorhinal system," Nature neuroscience, vol. 16, no. 2, pp. 130-138, 2013. Path planning for a robot is a compute intensive task. For a dynamic environment this is more cumbersome where position and orientation of obstacles changes often. As mentioned above, mammal's (particularly, human brain) brain however does the same task very quickly and efficiently. It does not re-plan blindly every time it faces a new environment. Instead, it tries to find out spatial similarity between environments and try to understand the similarity of context and then intelligently re-plan for the affected part of the previously planned path or use previously planned path as is either by doing some transformational geometric operations.

As a first hurdle, brain does not represent the environment as robots do. Robots usually plan their path in a square occupancy grid version of map, whereas brain represents it by a superposition of multiple hexagonal grid tessellation. These are done by firing hippocampal neurons called GRID cells. At the same time, some PLACE cell neurons fire when a human sees an object of interest. For human navigation, a complex representation of these two types of firing cells is used in a map which nearly looks hexagonal representation of map in brain as depicted in FIG. 1. In order to make robotic path planning more efficient the present disclosure has attempted for such brain functionalities to be implemented for vector navigation for paths planned. Referring back to FIG. 2, at step 202, in an embodiment of the present disclosure, the one or more hardware processors 104 obtain a two-dimension (2D) environment and represent the two-dimensional (2D) environment into a hexagonal grid map, wherein the hexagonal grid map comprises a plurality of hexagonal grid cells.

Along with triangles and squares, hexagons are the only regular polygons that can tessellate a 2-Dimensional space. Unlike triangles and squares, hexagons have few advantages, for example hexagons have two more degrees of freedom for movement and hexagons occupy the space with more efficiency than other two polygons (e.g., triangles and squares) of equal area. At the same time, neural map of 2-dimensional space is represented via regular hexagonal tessellation in brain. In order to mimic human navigation and path planning for robots, the first hurdle is to create an efficient representation for hexagons. A minimum of two parameters are required to represent a 2-D space, for example, the X-Y co-ordinate in Cartesian coordinate system or Rad-Ang in Polar coordinate system. The Cartesian coordinates are efficient as it is based on an orthonormal basis vectors. However, overlaying hexagonal grids on a Cartesian grid cells give rise to aliasing problems. Moreover, for visual representation of hexagonal grids on a pixelated display (with row and column pixels), it is necessary to translate the hexagonal coordinates onto an X-Y value at the display phase. Thus, either the data structure can be array based which requires translating to hexagonal grid before display; or, it can be a list of hexagonal grid centers with all calculations performed in a 60 degree rotated basis vector from the fundamental Y-axis (or X-axis), which are translated to fundamental orthonormal X-Y coordinates before rendering on screen. Later case is preferred because that actually stores locations of hexagonal cell centers and is easy to handle for finding spatial similarity later (refer FIG. 3B). More specifically, FIG. 3B, with reference to FIGS. 1 through 3A, depicts creation of dual of contiguous hexagonal centers used as basic building block for creating hexagonal tessellation of an environment in accordance with an example embodiment of the present disclosure. The hexagonal cells are snapped to a 60-deg angled coordinate system, with the A-axis at 0 deg and B-axis at 60 deg w.r.t. Cartesian X-axis (convention: positive angle=anticlockwise). The regular hexagon grid cells have a diameter (denoted by d), which is the scaling factor or the resolution (vertex to vertex pixel distance) of the map. A hexagonal grid cell (a, b) in this new A-B Coordinate system can be easily translated to the X-Y pixel coordinate for display with the transform: {x= (a+0.5*b)*d} and {y=(sqrt(3)*b/2)*d}. The 6 Moore/von-Neumann [refer] neighbour cells of (a,b) are {(a+1,b), (a,b+1), (a−1,b+1), (a−1,b), (a,b−1), (a+1,b−1)}. The Moore/von-Neumann neighbor cells technique is referenced from literature titled "Introduction to cellular automata," 2005 authored by J. Schiff. Below are description for Moore neighbours and Von-Neumann neighbours:

Moore neighbours: For any given cell in a square grid there are eight surrounding cells: four of them share at least one side and a vertex, while rest four share at least one vertex (but no sides) with the current cell. In a square grid, the vertex-sharing corner cells has a distance ratio of √2:1 with respect to the side-sharing cells.

Von-Neumann neighbours: For square grid, only the four side-sharing cells are considered as Von-Neumann neighbours of a given cell. The center of these cells are all at an equal distance from the center of the current cell.

Figure 4:
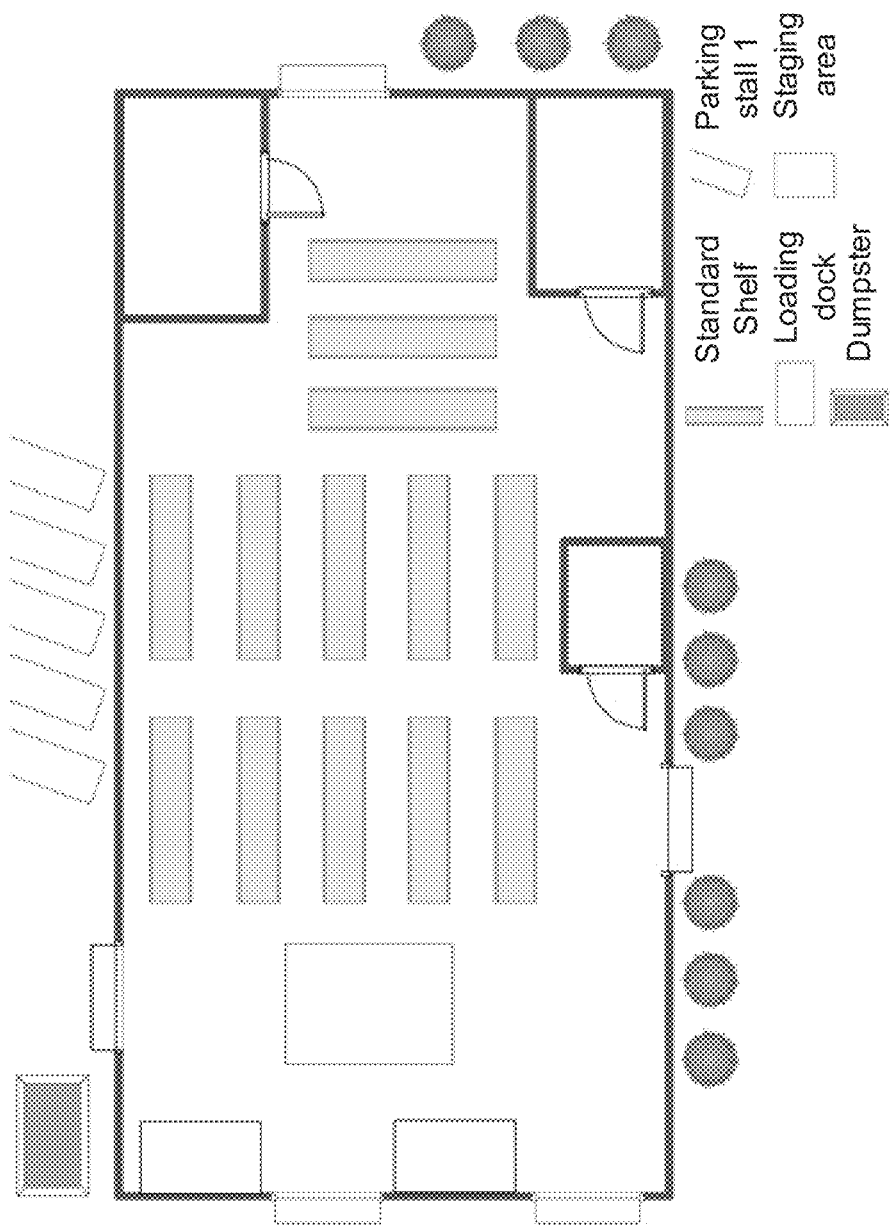
FIG. 4 depicts a 2D environment in accordance with an embodiment of the present disclosure.
Figure 5A:
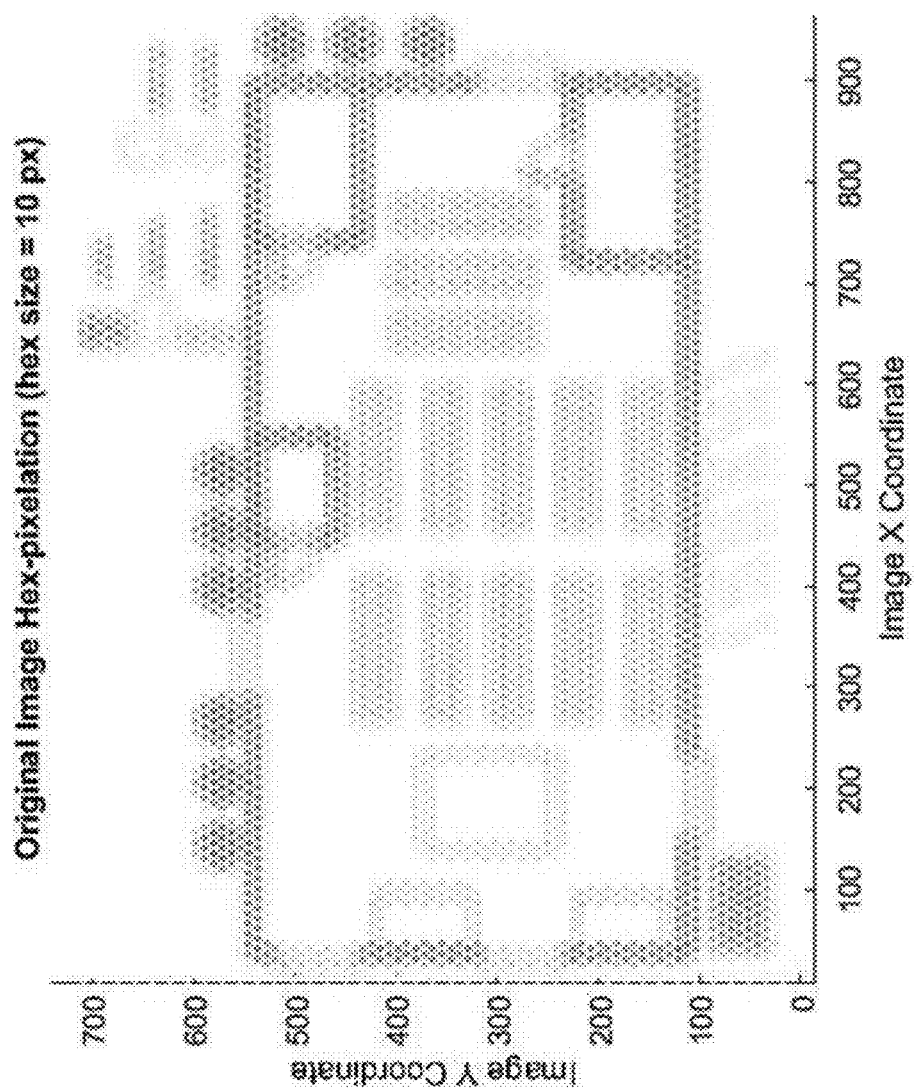
FIG. 5A-5C depict representation of the 2D environment into a hexagonal grid map at one or more zoom levels based on different center to center distances between hexagonal grid cells in accordance with an example embodiment of the present disclosure.
Figure 5B:
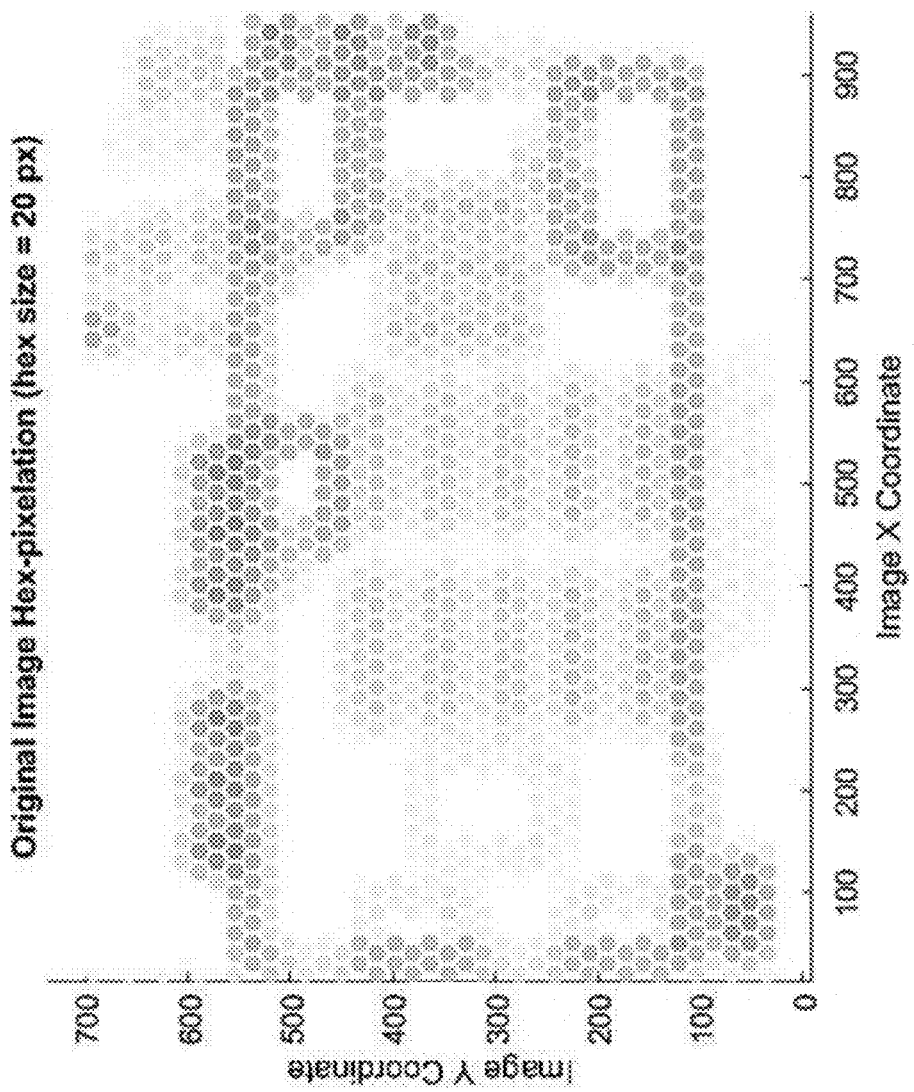
Figure 5C:
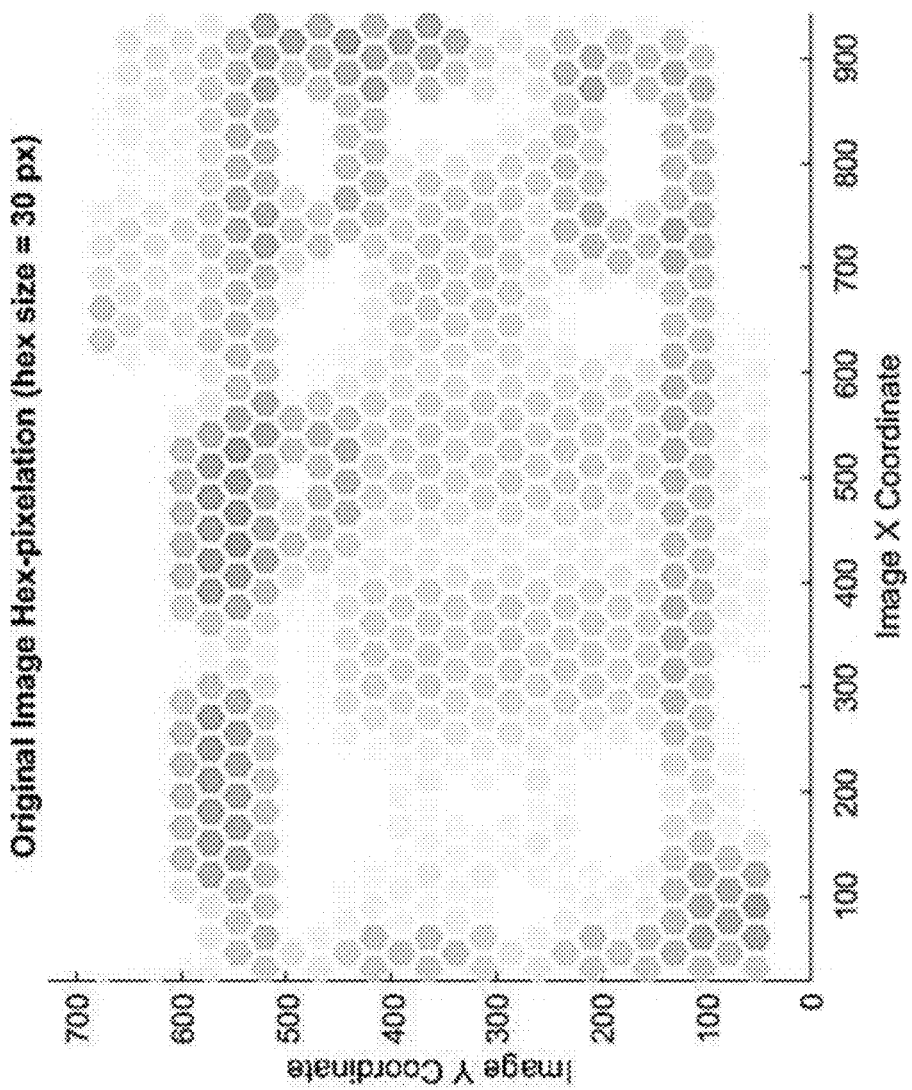

FIG. 4, with reference to FIGS. 1 through 3, depicts a 2D environment in accordance with an embodiment of the present disclosure. FIG. 5A-5C, with reference to FIGS. 1 through 4, depict representation of the 2D environment into a hexagonal grid map at one or more zoom levels based on different center to center distances between hexagonal grid cells in accordance with an example embodiment of the present disclosure. In an embodiment of the present disclosure, at step 204, the one or more hardware processors 104 identify one or more objects based on a comparison of Red Green Blue (RGB) value associated with a plurality of two or more contiguous cells from the plurality of hexagonal grid cells. In an embodiment, the one or more objects are identified based on number of hexagonal centers and distance of each hexagonal center from one or more hexagonal centers. In an embodiment, size and shape of the one or more objects are determined based on the distance. In an example embodiment, the distance herein refers at least one of Euclidean or Manhattan distance between two hexagonal centers. In an embodiment, the average RGB value for each hexagon grid cell are stored, with the hexagon center in a-b coordinate. Thus each hexagonal center may be associated with average RGB values. Contiguous hex cells having similar RGB values may represent an object because it is be assumed assume the colour and shape of the object may not change much.

The system 100, like a new learner, receives image(s) of environment(s) and then finds out what are different objects (as per RGB scheme above) in that map and annotates them with type of enumeration. The image will also provide an idea about the size, shape of the object in hexagon domain in terms of accumulated distance of hexagonal centers and in terms of number of hexagonal centers. Hence a tuple (e.g., 9 tuple) may be created as illustrated by way of example below:

<Annotation, Side of bounding square, Template shape, color (r, g, b, variance in r, variance in g, variance in b)

Where Annotation, shape can be predefined enumerations depending upon the scope of the environment. The last item in the 9-tuple is color which contains the RGB values of the object in the image/environment. As more and more images are fed to the system 100, the color experience may change and thus corresponding variance in value of r, g and b may get updated and stored. However if the value of r, g, b goes beyond a threshold then it may construe to a new color or new object. In other words, in an embodiment, the one or more objects are identified as one or more predefined objects when the RGB value of the one or more objects is equal to a predefined threshold. In another embodiment, the one or more objects are identified as new objects when the RGB value of the one or more objects is greater than or less than the predefined threshold.

To exemplify, one such 9-tuple can be:
<Obj_type_1, 20 pi X 35 pi, Round, Grey (127, 127, 127, 10, 14, 18)>

Such a tuple (e.g., 9-tuple) are stored in a database (e.g., an object database).

In an embodiment of the present disclosure, the predefined threshold for variance values here is taken as 20 and that is why all the variance values are within that tolerance limit.

With experience, i.e., with more and more images the system 100 keeps on creating rich object(s)/object database.

Figure 6:
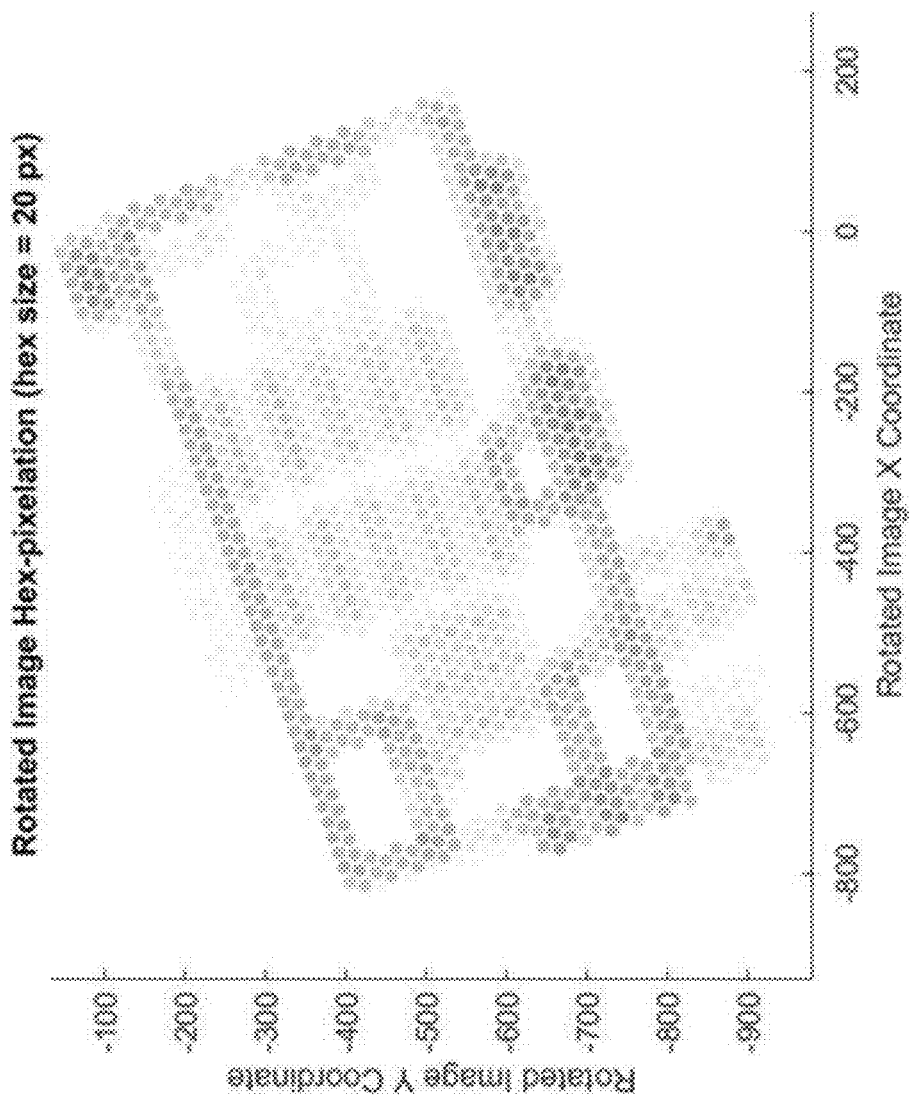
FIG. 6 depicts a representation of the hexagonal grid map transformed to one or more variations for comparison with the one or more pre-stored hexagonal grid maps to determine a Spatial Similarity Quotient (SSQ) in accordance with an example embodiment of the present disclosure.
Figure 7:
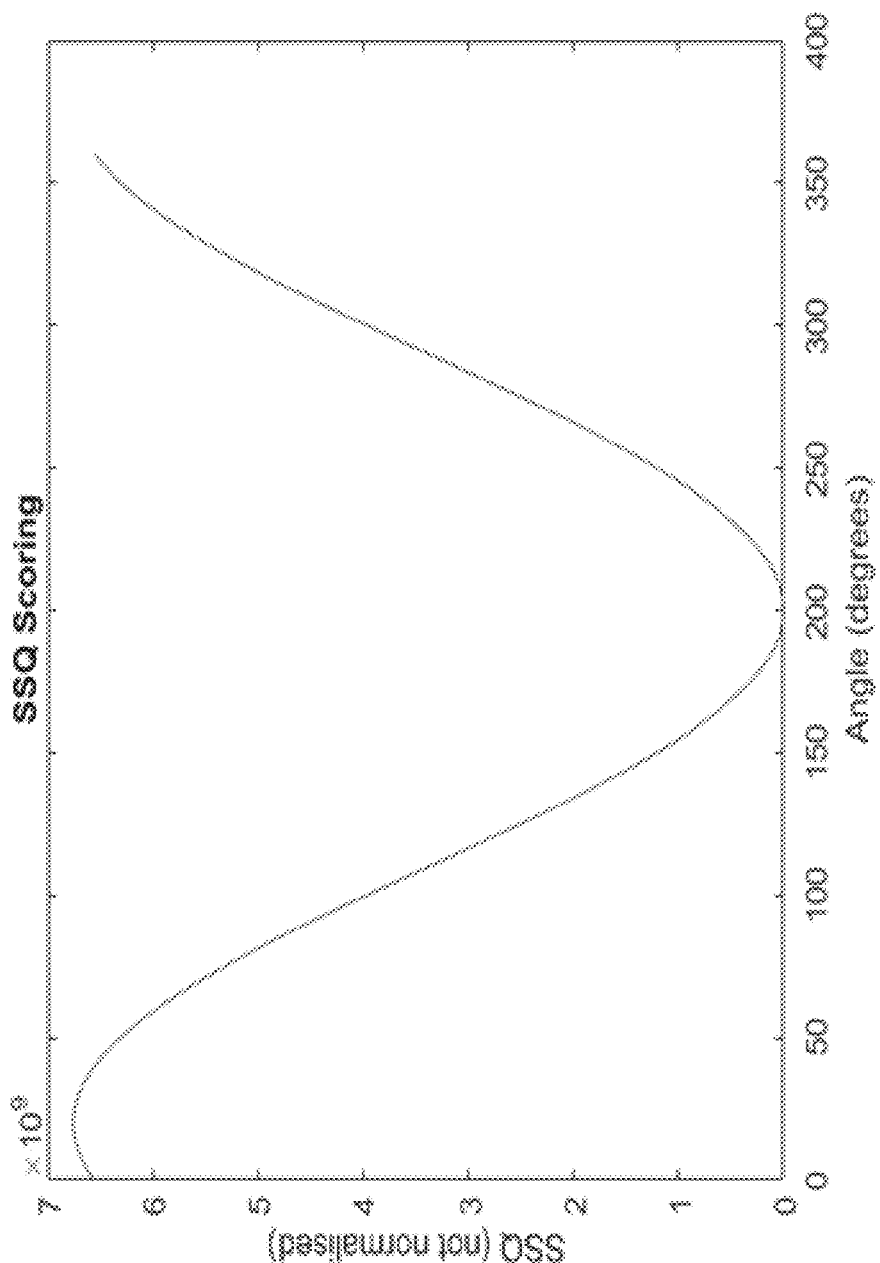
FIG. 7 illustrating a graphical representation depicting a comparison between original and rotated version of the hexagonal grid map and a maximum similarity found at 200 degree in accordance with an example embodiment of the present disclosure.

Upon identifying the one or more objects, at step 206, the one or more hardware processors 104 identify one or more candidate contexts based on the tuple (e.g., 9-tuple) created for the identified one or more objects. In an embodiment of the present disclosure, at step 208, the one or more hardware processors 104 iteratively perform a comparison of the hexagonal grid map with one or more pre-stored hexagonal grid maps. In an embodiment, more specifically, the represented hexagonal grid map is transformed to one or more variations (e.g., rotated at one or more angles) and iteratively compared with the one or more pre-stored hexagonal grid maps (obtained from a map database) to determine a Spatial Similarity Quotient (SSQ). FIG. 6, with reference to, FIGS. 1 through 5C, depicts a representation of the hexagonal grid map transformed to one or more variations for comparison with the one or more pre-stored hexagonal grid maps (also known as contexts) to determine the Spatial Similarity Quotient (SSQ) in accordance with an example embodiment of the present disclosure. In an embodiment of the present disclosure, the hexagonal grid map is transformed to one or more variations using at least one of a rotation technique, an affine transformation technique, a topological transformation technique, and the like. More specifically, in an example embodiment, as depicted in FIG. 6, the hexagonal grid map is rotated at one or more angles for comparison with the one or more pre-stored hexagonal grid maps. In other words, the one or more transformed variations of the hexagonal grid map is compared with the one or more pre-stored hexagonal grid maps for determination or computation of SSQ. In an embodiment, the SSQ is also referred as 'quantitative measure of similarity', wherein the Spatial Similarity Quotient is indicative of degree of overlap of the hexagonal grid map with at least one of the one or more pre-stored hexagonal grid maps. FIG. 7, with reference to, FIGS. 1 through 6, illustrating a graphical representation depicting a comparison between original and rotated version of the hexagonal grid map and a maximum similarity found at 200 degree in accordance with an example embodiment of the present disclosure. More specifically, at 200 degree rotation, the maximum similarity is obtained that determines a substantial (or maximum) degree of overlap of the hexagonal grid map with at least one of the one or more pre-stored hexagonal grid maps. More specifically, FIG. 7 illustrates a graphical representation of a Spatial Similarity Quotient (SSQ) comparison between hexagonal grid maps of FIGS. 5B and 6 in accordance with an example embodiment of the present disclosure.

Referring back to FIG. 2, in an embodiment of the present disclosure, at step 210, the one or more hardware processors 104 identify one or more contexts from the one or more candidate contexts based on the determined Spatial Similarity Quotient.

As the system 100 is fed or experienced with more and more environment(s) as input, the system 100 identifies which of the objects in the "object data base" i.e., Type O database are present in the environment and with what probability. This means if there are n-objects in Type O database then each environment or context C is represented a n-tuple where each element in the tuple is probability value of the object n being in that context. So one context C, will be a set $\{P_i\}$ where i run from 1 to n and $P_i$ denotes the probability of i-th object present at that context C. In an embodiment, there may be some probabilities with non-zero and with rest being zero as not all of the objects are present in one environment. For example, a context (aka environment) called BedRoom (say Ck) and it contains some Type 0 objects annotated like Bed, Bedlamp, AC (say 02, 08, 010), etc. Another context can be a Drawing Room (say $C_1$) where some Type 0 objects for example, Chair, Table, TV (say 05, 09, 07) etc., are present.

Thus the context representation for these cases may look like:

$C_k$={0, 0.4, 0, 0, 0, 0, 0, 0.9, 0, 0.5, 0, upto m}→Bedroom
$C_j$={0, 0, 0, 0, 0.5, 0, 0.9, 0, 0.2, 0, 0, upto m}→Drawing Room More the system 100 gathers experience with this kind of environments, more confidently the system 100 can identify exact set of Type 0 objects for each different context. The set of contexts may be referred as 'Type C database'.

Thus each entry in the Type C database is a context. The mapping database is practically a matrix containing probability of an object being in different context i.e., columns are objects from Type B database and rows are environments or contexts i.e., entries from Type C database. A sample matrix of the context database may be represented by way of example below:

|  | NoOfObs for Object 1 | NoOfObs for Object 2 | NoOfObs for Object m |
|---|---|---|---|
| NoOfObs for Context 1 | Prob of Obj 1 being in Contxt 1 | Prob of Obj 2 being in Contxt 1 | Prob of Obj m being in Contxt 1 |
| NoOfObs for Context 2 | Prob of Obj 1 being in Contxt 2 | Prob of Obj 2 being in Contxt 2 | Prob of Obj m being in Contxt 2 |
| NoOfObs for Context 3 . . . | Prob of Obj 1 being in Contxt 3 | Prob of Obj 2 being in Contxt 3 | Prob of Obj m being in Contxt 3 |
| NoOfObs for Context n | Prob of Obj 1 being in Contxt n | Prob of Obj 2 being in Contxt n | Prob of Obj m being in Contxt n |

In an embodiment of the present disclosure, the value of the probabilities in each cell may keep on changing as life-time of the system 100 increases i.e., they change as more and more environments/objects and repetition of environment/objects are processed by the system 100.

Referring back to FIG. 2, in an embodiment, at step 212, the one or more hardware processors 104 dynamically plan a path for vector navigation (e.g., a start point and an end point) within the hexagonal grid map based on the one or more objects, and the identified one or more contexts.

Once the Type O and Type C database are generated and when the system 100 receives a new environment, the system 100 determines if any of the objects (of Type O) is present in that scene. If a certain set of Type O objects are found then the context from Type C is retrieved. However, the set of Type O may have a one-to-many relationship with Context from Type C. Thus multiple matches from Type C can be retrieved for a given scene. For e.g., ball and man from Type O together can be in environments 'room' and 'playground' from Type C.

Once the set of probable Type C contexts are identified then the system 100 compares semantic similarity between these probable contexts and the newly arrived context. Geometric transformation, hexagonal rotation, scaling up and down techniques, etc., may be applied on the full or part of the map to identify the Maximum Spatial Similarity Quotient (SSQ) with current map and the probable Type C contexts. In an embodiment of the present disclosure, a certain threshold value of SSQ (as per accuracy requirement of the use case or end application) is defined, and a comparison is performed between the probable contexts (or candidate contexts) and the hexagonal grid map under consideration. In other words, the one or more hardware processors 104 perform a comparison of the hexagonal grid map with the one or more candidate contexts to obtain a maximum SSQ, and identify an environment as a new environment or a pre-defined environment based on the comparison of the maximum SSQ with a pre-defined threshold. When the maximum SSQ is below the pre-defined threshold then the system 100 identifies the current hexagonal grid map with corresponding subset of Type 0 objects as a new environment i.e., one member of Type C core database increases. In other words, if the maximum SSQ is greater than the threshold, then it is a pre-defined environment, else, when the maximum SSQ is less than or equal to the threshold, then it is a new environment.

Below is an exemplary formulae implemented for computing a SSQ:

It is assumed that center of one hexagon of a given map has co-ordinate $(a_1, b_1)$. The whole map being a set of such hexagons, say N, the map can be represented as $\{(a_i, b_i)\} \forall i \in N$. At the same time, the map with which the system 100 wants to find the SSQ has a similar co-ordinate set for example $\{(\hat{a}_i, \hat{b}_i)\} \forall i \in N$. It is further determined that which angle these two map match the most. For that purpose, the system 100 rotates the first map by some angular step, say r°. Hence the system tries to find SSQ for each angle $\theta \in \{r°, 2r°, 3r°, \ldots, 360°\}$. For rotation, each hexagonal center co-ordinate vector $[a_i b_i]$ is multiplied by a rotation matrix R resulting into new rotated co-ordinate vectors $[a_i \theta b_i \theta]$ where R is represented by way of example expression below:

$$R = \begin{bmatrix} \cos\theta & -\sin\theta \\ \sin\theta & \cos\theta \end{bmatrix}$$

The SSQ is calculate for each such rotation angle θ by way of following example formula:

$$SSQ_\theta = \Sigma_a \Sigma_b [(a_i^\theta - \hat{a}_i)^2 + (b_i^\theta - \hat{b}_i)^2] \quad (1)$$

Figure 8:
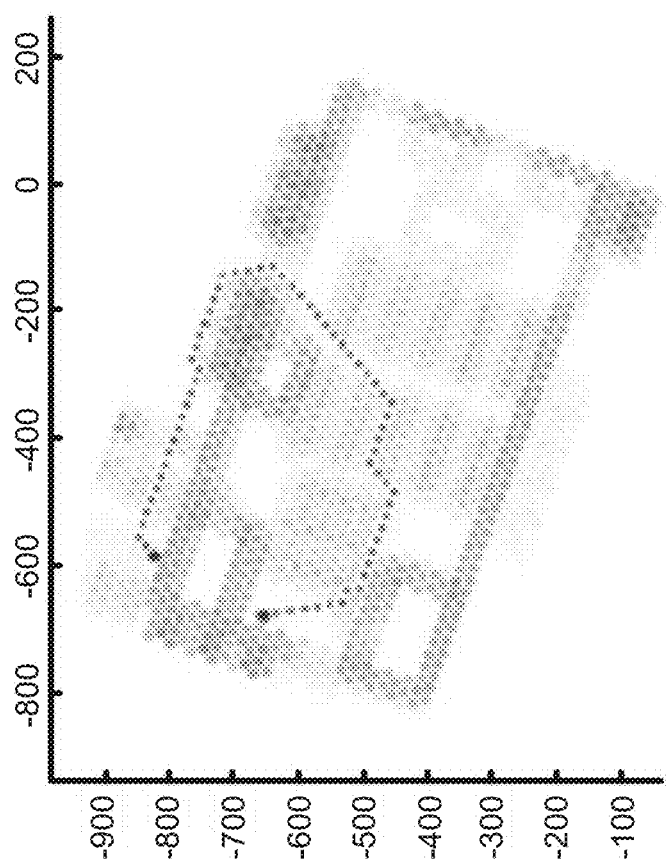
FIG. 8 illustrates a translated path within a hexagonal grip map in accordance with an example embodiment of the present disclosure.

Of the different trial steps, the θ for which a minimum value of $SSQ_0$ is obtained would denote the angle of rotation for which maximum similarity between two map exist. The target path is known for one of the maps and it is intended to find a direct translation of the path for the other map without executing the path planning algorithm. The plot $SSQ_O$ versus θ as shown in FIG. 7 shows that these two maps are spatially similar at an angle 200° for which $SSQ_O$ is minimum. The translated path is shown in FIG. 8 with dotted line representation.

If however the SSQ is found to be higher than the pre-defined threshold thus conveying a semantic match with a context, say Context C1, then the corresponding details of the context is updated with readings from this new entry i.e., Context C1 is updated with the belief value/probability and number of readings. Similarly, the corresponding entries in the Type 0 objects (that are present in the Context C1) are also updated i.e., variance for each object is updated.

Each context is represented by a Type S database consisting of 3-tuple provided by way of example below:

<a, b, ObjectProbability>, where a and b are hexagonal center coordinates in (a, b) coordinate system defined above and ObjectProbability is the combined probability of finding any object among those defined in Type O database. Type S database has multiple entries each corresponding to these 3-tuples.

Alternatively, (1-ObjectProbability) can be thought of as probability of the hexagonal grid cell being free for robotic motion. This means if (1-ObjectProbability) is zero then the hexagonal grid cell is completely free for navigation and there is no obstacle in that cell in the hexagonal grid map.

This representation of context can be thought of in a more enriched way provided by an example below:

<a, b, ObjectAnnotation, ObjectProbability, noOfObservation> where a, b, ObjectProbability carry same meaning and ObjectAnnotation is the name of the object from Type O database and noOfObservation denotes the number of times the system has experienced this environment where it found that this particular object occupies this particular (a, b) co-ordinate in that environment. Inclusion of the last parameter provides the weight of belief of the system 100 that this particular object occupies this particular place. This may in turn be used for modelling the time evolution of the environment.

To exemplify, one such tuple in a context $C_i$ may represent as below:

<10, 12, Chair, 0.6, 30>, which means the system believes that at (10,12) coordinate there will be a chair with probability 0.6 and that has been calculated or is believed to be true based on past 30 observations.

Now the value of probability changes with increase in number of observation and after say 80 observation the tuple may represent as below:

<10, 12, Chair, 0.4, 50>

And 2 new tuples may be added for that co-ordinate and represent as below:

<10, 12, Table, 0.4, 20>

<10, 12, none, 0.2, 10>

This means that Chair is not always at (10, 12). It remained there for first 50 iterations but next 20 iterations says that there is a new object called Table thus reducing the probability of Chair in first tuple and creating a new tuple for Table. Along with this, last 10 observations says there is nothing placed in that particular coordinate which means it is free from obstacle.

If the system stores a record of this tuples, how they are changed over iterations or number of observations then it can automatically deduce from those records that how over time or over number of observations the nature of position of object(s) changes over time and how the whole map changes over time. If this time-evolution is found to be a regular feature then it can be used for creating a stable time-model for that environment. To incorporate this feature of time-evolution the present disclosure incorporates time stamp inside the tuples and they may represent as below:

<10, 12, Chair, Time1>, <10, 12, Chair, Time2> . . . <10, 12, Chair, Time50>

<10, 12, Table, Time51> . . . <10, 12, Table, Time71>

<10, 12, none, Time72> . . . <10, 12, none, Time 82>

Needless to say, these tuples are created based on multiple situations (here observations) the system 100 experiences in its lifetime or training. More the training/experience are, more refined or believable are the probability values of these tuples against an annotation.

Once the context is mentioned for a Robot (or machine) then the robot (or machine) may have a fair idea about where to look for a TV in a Room (most probable place for a TV is wall) or it will know in advance that most probable place to look for a Table Lamp in a Room is at the corner. This information is useful for path planning in a given context because location of the objects are well known with some known level of confidence.

The present disclosure provides context based vector navigation for each hexagonal grip map wherein SSQ is identified with known environments as discussed above. Then a start and goal location is accepted on the current map from a user. This input may either be as specific hexagonal grid cells, or 2 identifiable objects on the map (e.g., a box, and a rack). Then the system 100 dynamically plans path (using D* Lite for known space or Q-Learning technique for unknown space) and at each step it takes input from the user (emulating robot sensors) of the actual dynamic objects present. The path may further be adjusted based on the chosen navigation algorithm.

Alternatively, the system 100 enables to load features of selected environment (both fixed and dynamic object probabilities). The system 100 plans path using D* Lite or Q-Learning algorithm taking into account current map and loaded environment. The chosen environment aka a context of Type A is a probabilistic model from the training set and the current incoming map is a map with ground truth which needs to be overlapped belief wise so that no object is overlooked. Hence, the system 100 creates a probable environment map by a weighted overlap of the chosen environment with the given map. And path is planned based on objects in the probable environment map.

For example, say in a given Type S map, system calculates path from a start point to a goal point. Since Type S map actually provides past experience (using historical data stored in the memory for subsequent updation of the databases 108A-N (object database, context database, map database)) about position of objects and free paths in the corresponding environment, then based on a threshold of allowable objects (say 40%) the system offers three path options with object(s) probabilities 10%, 20% and 30% respectively. Now given no idea about present snapshot of the same environment, the system may choose the first path with 10% obstacle probability. It is assumed that this path is also the shortest path. But if the system 100 gets the present snapshot of the environment and finds that there is an object in this 10% path, then it rejects the path and optimally selects one of the rest two paths based on minimal travel cost and obstacle probability. This enables the system 100 to further train a robot using the dynamically planned path, the one or more contexts and the one or more objects identified for subsequent path planning subsequent and vector navigation, and to further generate a database that comprises information pertaining to the subsequent path planning and vector navigation for increased efficiency and easy of navigation in future.

Below is an illustrative example description of correlation or associativity between various databases (e.g., object database, context database, map database and the like):

The system 100 eventually identifies a correlation or associativity between objects in a given context using the Type O and Type C database. For example, a sofa is usually associated with a table in a context or a mirror is usually associated with a wall in another context are some exemplary associativity and if these information are understood over experience by the system 100 then these information can be used efficiently during path planning. For example, if a chair is found in a context then there are high chance that a table is somewhere in vicinity/proximity and this information can be used by a robot to look for path beyond the probable position of table instead of actually identifying the obstacle named Table. More the training/experience are, more refined, strong and believable are the correlation/associativity between these objects.

Likewise the above concept can be extended for contexts. One context appearing after another context repetitively strengthens consecutive context. Not only the sequential associativity but also the parallel associativity or no associativity at all can be found from the database. One example may be: a drawing room always comes after a bedroom (sequential) or a drawing room is connected to multiple rooms (parallel). This associativity/correlation belief can be used for inter-context path planning as discussed below.

Inter-Context Path Planning:

The system 100 can be used to plan path across multiple contexts or environments which is not possible by present or traditional robotic path planning systems. Navigation or path planning across contexts requires identifying common objects that fall in the intersection of both contexts. These objects that are there in the common intersection are the connecting points for inter-context path planning. However not all objects can be feasibly used for navigation, but only those that fall in the boundary of both contexts or are contiguous in both contexts can be used for navigation or path planning. In other words, the system 100 (or the one or more hardware processors 104 identify one or more common objects (e.g., door, wall, window, etc.) that indicate an intersection of two or more contexts (e.g., kitchen, dining, and hall), and generate a path based on one or more navigable objects (e.g., door) identified from the one or more common objects from the intersection of the two or more contexts.

For example, for navigating from bed room to road outside, the system 100 identifies that it needs to cover three context namely bedroom, dining room and road. Now in the intersection of bedroom and dining room there may be objects like door, chair, etc. But door may be used for navigation across bedroom context to dining room context as door falls in the boundary of both maps. This kind of context stitching and inter-context path planning can be used for robots and cars for city navigation. It is to be noted that not only the intersection of context is required but also a physical snapshot of current position/map is required for successful navigation. To elaborate using previous example, if the current snapshot of bedroom shows that the door common between bedroom and dining room is closed for some reason then though door is identified as most feasible object of passing through but the path planning may fail.

Figure 9:
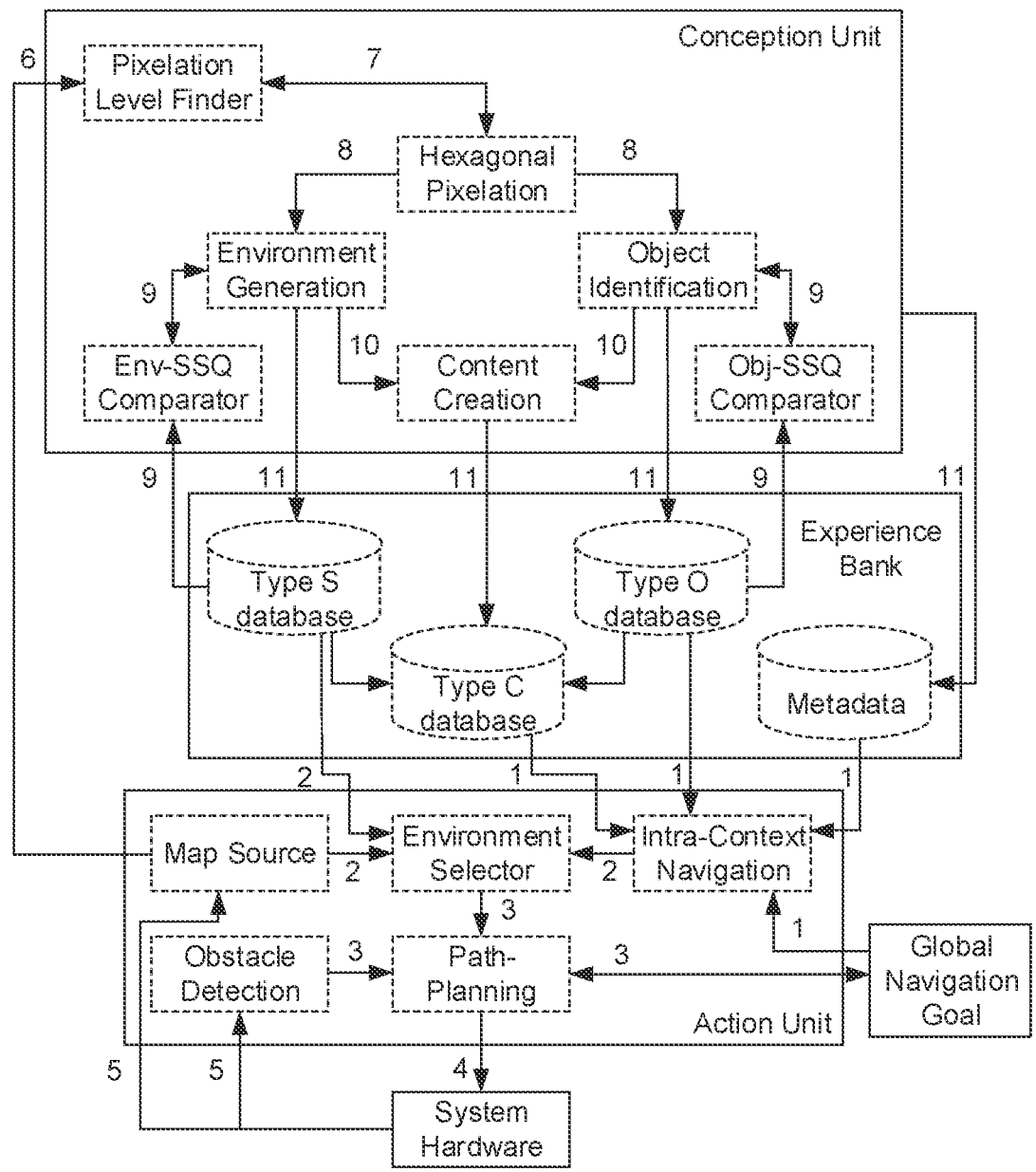
FIG. 9 illustrates an exemplary block diagram depicting an implementation of the system of FIG. 1 in accordance with an example embodiment of the present disclosure.

Furthermore, the system 100 may also identify the one or more objects, the one or more contexts based on information obtained from one or more sensors. This is elaborated further by way of example below:

Multi-Sensor Extension:

For instance, if a robot has an audio sensor then different sound profiles can be identified and can be used to populate/associated with Type O objects or Type S locations/contexts. Similarly if it has a haptic (touch) sensor then different surfaces or touch feelings can be identified and can be associated with objects or contexts. Similar extension is possible using sensors for example, temperature, pressure, etc. FIG. 9, with reference to, FIGS. 1 through 8, illustrates an exemplary block diagram depicting an implementation of the system 100 in accordance with an example embodiment of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining and representing a two-dimensional (2D) environment into a hexagonal grid map, wherein the hexagonal grid map comprises a plurality of hexagonal grid cells (202);
   identifying one or more objects based on a comparison of Red Green Blue (RGB) value associated with a plurality of two or more contiguous cells from the plurality of hexagonal grid cells, wherein the one or more objects are identified based on number of hexagonal centers and distance of center of each hexagonal grid cell from center of one or more hexagonal grid cells (204);
   identifying one or more candidate contexts based on a tuple created for the identified one or more objects (206);
   iteratively performing a comparison of the hexagonal grid map with one or more pre-stored hexagonal grid maps, wherein the hexagonal grid map is description and iteratively compared with the one or more pre-stored hexagonal grid maps obtained from a map database to determine a Spatial Similarity Quotient (SSQ), and wherein the Spatial Similarity Quotient is indicative of degree of overlap of the hexagonal grid map with at least one of the one or more pre-stored hexagonal grid maps (208);
   identifying one or more contexts from the one or more candidate contexts based on the determined spatial similarity quotient (210); and
   dynamically planning a path for vector navigation within the hexagonal grid map based on the one or more objects, and the identified one or more contexts (212).

2. The processor implemented method of claim 1, further comprising generating an object database for each of the one or more objects based on an annotation, side of bounding square, a template shape, and a variance in the RGB value.

3. The processor implemented method of claim 1, further comprising generating a context database for each of the one or more probable contexts with the identified one or more objects in a tuple.

4. The processor implemented method of claim 1, wherein the one or more objects are identified as one or more predefined objects when the RGB value of the one or more objects is equal to a predefined threshold.

5. The processor implemented method of claim 1, wherein the one or more objects are determined as new objects when the RGB value of the one or more objects is greater than or less than a predefined threshold.

6. The processor implemented method of claim 1, wherein size and shape of the one or more objects are determined based on the distance.

7. The processor implemented method of claim 1, further comprising
   identifying one or more common objects that indicate an intersection of two or more contexts; and
   generating a path based on one or more navigable objects identified from the one or more common objects from the intersection of the two or more contexts.

8. The processor implemented method of claim 1, wherein the one or more contexts and the one or more objects are identified using information obtained from one or more sensors.

9. The processor implemented method of claim 1, further comprising
   training a robot using the dynamically planned path, the one or more contexts and the one or more objects identified for subsequent path planning and vector navigation; and
   generating a database comprising information pertaining to the subsequent path planning and vector navigation.

10. The processor implemented method of claim 1, further comprising:
    performing a comparison of the hexagonal grid map with the one or more candidate contexts to obtain a maximum SSQ; and
    identifying an environment as a new environment or a pre-defined environment based on the comparison of the maximum SSQ with a pre-defined threshold.

11. A system (100), comprising:
    a memory (102) storing instructions;
    one or more communication interfaces (106); and
    one or more hardware processors (104) coupled to the memory (102) via the one or more communication interfaces (106), wherein the one or more hardware processors (104) are configured by the instructions to:
    obtain and represent a two-dimensional (2D) environment into a hexagonal grid map, wherein the hexagonal grid map comprises a plurality of hexagonal grid cells;
    identify one or more objects based on a comparison of Red Green Blue (RGB) value associated with a plurality of two or more contiguous cells from the plurality of hexagonal grid cells, wherein the one or more objects are identified based on number of hexagonal centers and distance of center of each hexagonal grid cell from center of one or more hexagonal grid cells;

identify one or more candidate contexts based on a tuple created for the identified one or more objects;

iteratively perform a comparison of the hexagonal grid map with one or more pre-stored hexagonal grid maps, wherein the hexagonal grid map is transformed to one or more variations and iteratively compared with the one or more pre-stored hexagonal grid maps obtained from a map database to determine a Spatial Similarity Quotient (SSQ), wherein the Spatial Similarity Quotient is indicative of degree of overlap of the hexagonal grid map with at least one of the one or more pre-stored hexagonal grid maps;

identify one or more contexts from the one or more candidate contexts based on the determined spatial similarity quotient; and dynamically plan a path for vector navigation within the hexagonal grid map based on the one or more objects, and the identified one or more contexts.

12. The system of claim 11, wherein the one or more hardware processors are further configured by the instructions to generate an object database for each of the one or more objects based on an annotation, side of bounding square, a template shape, and a variance in the RGB value.

13. The system of claim 11, wherein the one or more hardware processors are further configured by the instructions to generate a context database for each of the one or more probable contexts with the identified one or more objects in a tuple.

14. The system of claim 11, wherein the one or more objects are identified as one or more predefined objects when the RGB value of the one or more objects is equal to a predefined threshold.

15. The system of claim 11, wherein the one or more objects are determined as new objects when the RGB value of the one or more objects is greater than or less than a predefined threshold.

16. The system of claim 11, wherein size and shape of the one or more objects are determined based on the distance.

17. The system of claim 11, wherein the one or more hardware processors are further configured by the instructions to:
identify one or more common objects that indicate an intersection of two or more contexts; and
generate a path based on one or more navigable objects identified from the one or more common objects from the intersection of the two or more contexts.

18. The system of claim 11, wherein the one or more contexts and the one or more objects are identified using information obtained from one or more sensors.

19. The system of claim 11, wherein the one or more hardware processors are further configured by the instructions to:
train a robot using the dynamically planned path, the one or more contexts and the one or more objects identified for subsequent path planning and vector navigation; and
generate a database comprising information pertaining to the subsequent path planning and vector navigation.

20. The system of claim 11, wherein the one or more hardware processors are further configured by the instructions to:
perform a comparison of the hexagonal grid map with the one or more candidate contexts to obtain a maximum SSQ; and
identify an environment as a new environment or a pre-defined environment based on the comparison of the maximum SSQ with a pre-defined threshold.

* * * * *